July 31, 1928.
R. S. McLEOD ET AL
1,678,912
ELECTRIC MOTOR
Filed March 5, 1925
4 Sheets-Sheet 1
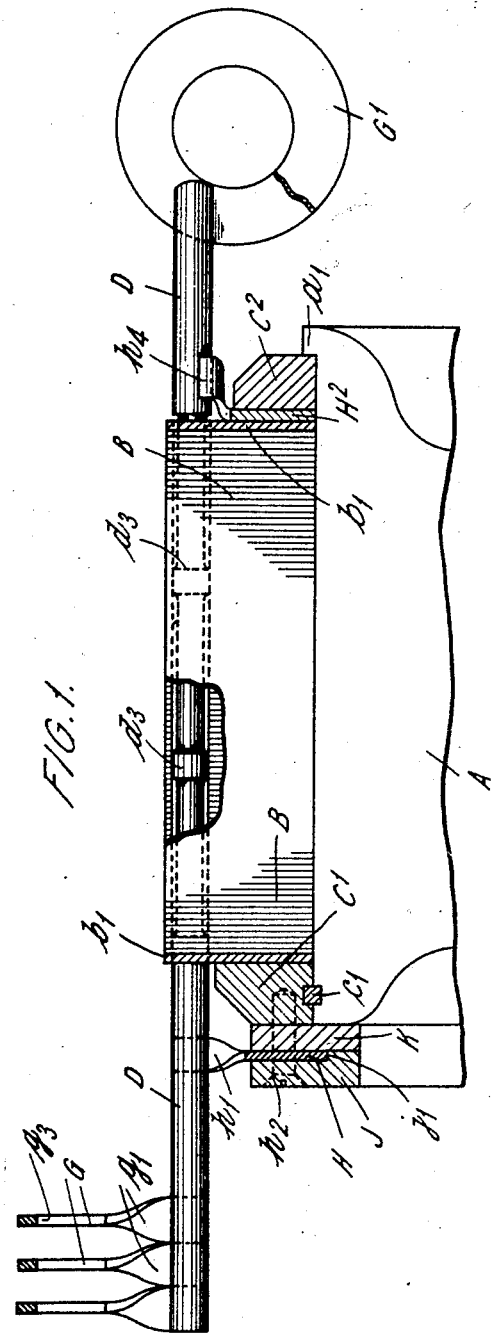
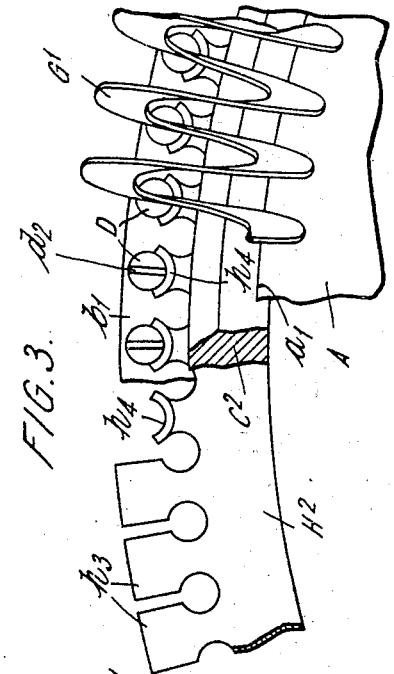
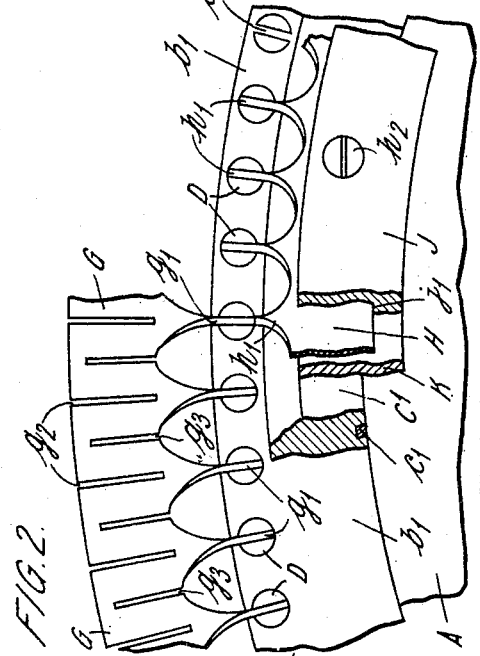
INVENTORS:
ROBERT S. McLEOD
GEORGE E. MASON
WILLIAM STANSFIELD

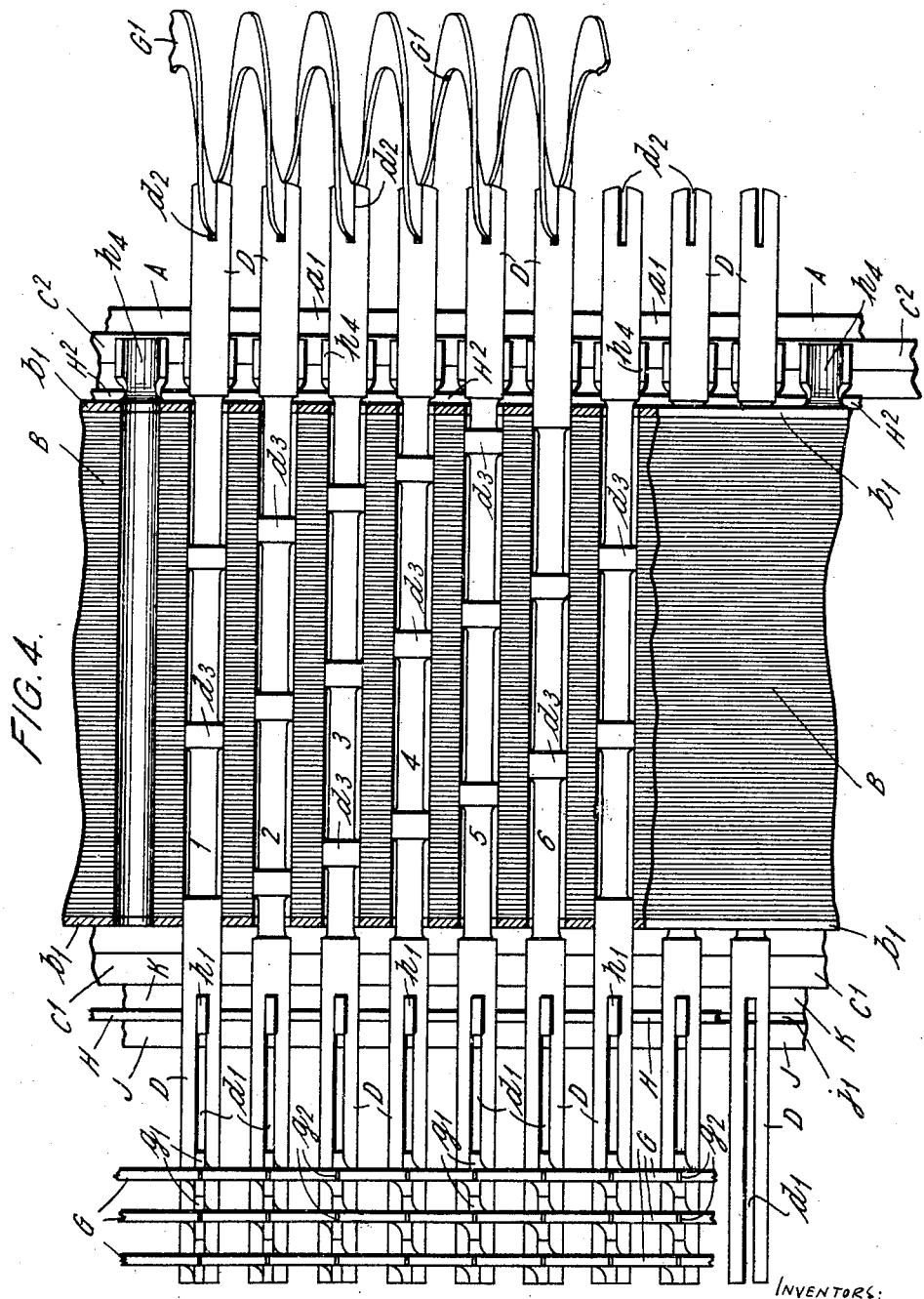

July 31, 1928.

R. S. McLEOD ET AL 1,678,912

ELECTRIC MOTOR

Filed March 5, 1925   4 Sheets-Sheet 3

INVENTORS:
ROBERT S. McLEOD
GEORGE E. MASON
WILLIAM STANSFIELD

By Spear, Middleton, Donaldson & Hall
Attys.

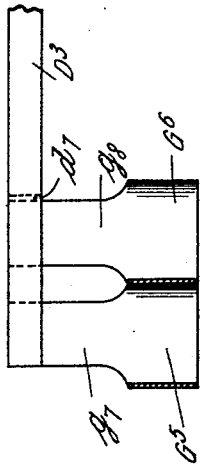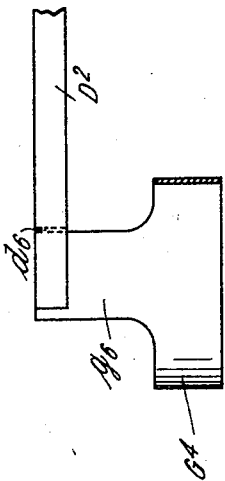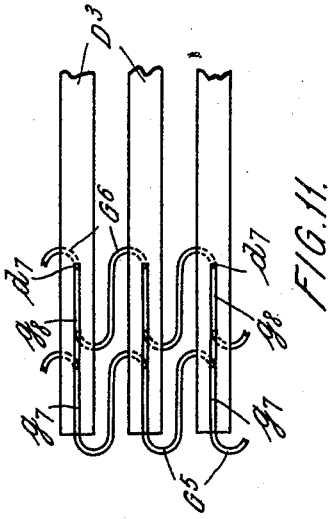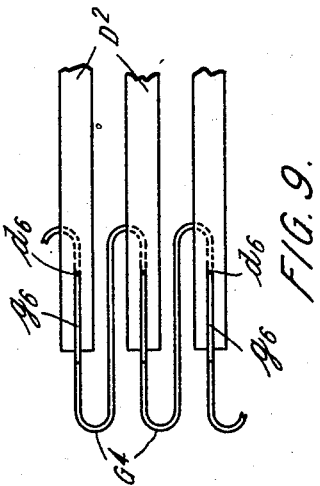

Patented July 31, 1928.

1,678,912

UNITED STATES PATENT OFFICE.

ROBERT STAFFORD McLEOD, OF MANCHESTER, GEORGE ERIC MASON, OF HALE, AND WILLIAM STANSFIELD, OF CHORLTON-CUM-HARDY, ENGLAND.

ELECTRIC MOTOR.

Application filed March 5, 1925, Serial No. 13,310, and in Great Britain March 5, 1924.

This invention relates to electric motors having rotors of the squirrel cage type, and has reference more particularly to the rotor bars and their end-connections, the object being to improve the construction and action of squirrel cage rotors.

According to the present invention we connect the bars of a squirrel cage rotor together by means of end-connections which have comparatively small ohmic resistance but which are so constructed as to possess sufficient inductance to ensure that with the comparatively high rotor frequency which obtains as the motor is started up, the impedance of the end-connections limits the magnitude of the rotor currents flowing through them; as the rotor speeds up, and the frequency decreases, the impedance of the end-connections is reduced, so that as synchronous speed is approached the full-load current is carried by the end-connections and as these have a comparatively low ohmic resistance, the heat generated is comparatively small; the rotor bars in addition to being fitted with end-connections as described, which will be referred to as inductance end-connections, may also be fitted with end-connections having a comparatively high ohmic resistance, which at high frequency carry a considerable proportion of the rotor current, and the resistance of which serves to limit the magnitude of the said proportion; these end-connections, which will be termed resistance end-connections, are however in effect short-circuited by the inductance end connectors when the frequency is decreased as synchronism is approached, with the result that at normal speed the current is mainly carried by the inductance end-connections, the heat losses in resistance end-connections are therefore comparatively small. In the preferred arrangement both resistance and inductance end-connections are fitted at one end of the set of rotor bars, the other ends of which are connected in the usual manner, but either resistance or inductance end-connections, or both, may be fitted at each end of the one set of bars.

We find with end-connections constructed as herein described that currents pass, between rotor bars of differing potential, through the core discs with which said bars are in abutting contact, and the present invention comprises a construction of rotor bars adapted to overcome this difficulty, according to which the bars, between which there may be a difference of potential, bear against the slots in the core discs for portions only of their lengths, and said portions are staggered so as to be located in different axial positions in the different bars; this is preferably accomplished by making the external transverse dimensions of the respective bars less than the corresponding dimensions of the slots except at short separated bearing parts, the bars being of stepped construction and the said bearing parts being in the different bars differently spaced axially.

We have by way of example, illustrated our invention as applied to the rotor of a squirrel cage motor, in the accompanying drawings, in which:—

Fig. 1 is an elevation in section on a plane passing through the axis of the rotor and between adjacent rotor bars, a fragmentary section being shown on a similar plane passing through the said axis and a rotor bar.

Fig. 2 is a part end elevation viewed from the left hand end of Fig. 1, and

Fig. 3 is a part end elevation viewed from the right hand end of Fig. 1.

Fig. 4 is a developed plan partly in section on a plane passing through the axis of the rotor bars;

Fig. 8 is an elevation and Fig. 9 is a plan, of a modified construction of end connector, and Figs. 10 and 11 are similar views of a further modification.

Figure 6:
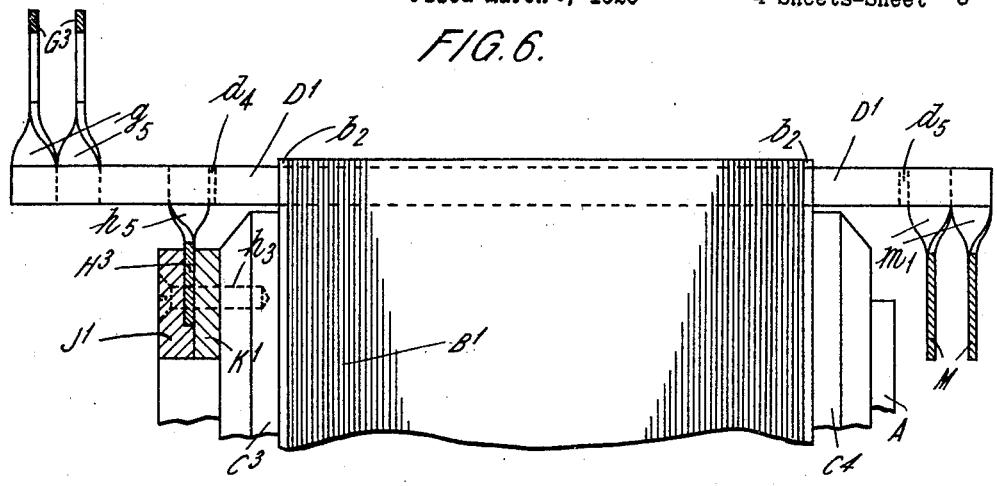
Fig. 6 is a view, similar to Fig. 1, of a modification.

Referring first to Figs. 1 to 5:—

A is the hub of the rotor which is mounted in the usual manner on the rotor shaft; B are the rotor core plates, $b^1$ being the thicker end plates; $C^1$ and $C^2$ are the end locating rings, the ring $C^2$ bearing against the shoulder $a^1$ of the hub and the ring $C^1$ being fixed in position by any suitable means, say a key $c^1$.

D are the rotor bars; G are the resistance end connections, each consisting of an annular disc G having internal teeth $g^1$ the ends of which are twisted until their planes are at right angles to the plane of the disc, said ends fitting in slots $d^1$ formed in the ends of the rotor bars, the ends being secured in position by being brazed or otherwise securely fixed in position. In order to increase the resistance between the rotor bars, each disc part G has slots $g^2$ and $g^3$ cut in it, alternate slots being reversely disposed as shown.

H are end connectors having low resistance and inductance. These consist of an annular disc-part H and teeth $h^1$ which are bent as described in connection with the teeth $g^1$, and are secured in the slots in the same manner as described in connection with the latter.

In order to provide the necessary inductance for the connectors H they are embedded in ferruginous material; in the arrangement illustrated, two iron rings J and K are fitted on opposite sides of the disc part H; the ring J is recessed as shown at $j^1$ to a depth equal to the thickness of the disc part H. The ring K bears against the end ring $C^1$, and the rings J and K with the disc portion H in position between them are pressed together axially, preferably by means of suitably spaced screws $h^2$ passing through the ring J, the disc H and the ring K and screwing into screw-threaded holes in the end ring $C^1$.

Where resistance end connectors and end connectors possessing inductance are fitted at each end of the rotor bars, the resistance connectors $G^1$ at one end of the rotor bars may be formed by winding a strip, of suitable thickness and width, on edge into a cylindrical spiral, and then bending the spiral so constructed until its axis assumes a circular shape, the adjacent ends of the strip being connected together by brazing, riveting or the like; the successive convolutions of the circular spiral thus formed are inserted in the slots $d^2$ formed at the right hand end of the rotor bars D and are secured in position therein by brazing or the like; in the example illustrated there is one convolution of the spiral between each adjacent pair of rotor bars, but obviously there may be two or more such spirals.

The end connector $H^2$ shown at the right hand end of the rotor bars consists of an annular disc portion having external teeth $h^3$ punched to shape as shown on the left hand side of Fig. 3; these teeth are bent about their roots until they are at right angles to the plane of the annular disc portion; the bent over portions being shaped to form trough-like extensions $h^4$ which fit under, and are adapted to be connected to the respective rotor bars, thus obviating the necessity for carrying the slots $d^2$ further along the bar than is necessary to accommodate the strip $G^1$. The disc portion $H^2$ of the connectors is interposed between the end ring $b^1$ of the core discs and the locating ring $C^2$, is pressed between these two rings by the axial pressure to which the core plates are subjected during construction.

In the example illustrated the rotor bars are of circular cross-section and fit in circular holes or channels formed in the cores by the alignment of circumferentially disposed holes punched in the core plates. The portion of the bar within the rotor core is reduced in cross-sectional dimensions except at suitably spaced comparatively narrow bearing surfaces $d^3$, which are of the full transverse dimensions and fit against the walls of the hole or channel. These bearing surfaces $d^3$ are spaced differently on the different bars as shown in Fig. 4. Taking a group of bars marked 1, 2, 3, 4, 5 and 6, corresponding with a pole grouping, the bearing surfaces $d^3$ are staggered throughout the group so that the bearing surfaces of the different bars bear against different groups of the core plates, and as the latter are insulated from each other in the usual way, any current tending to flow between bars of differing potential has to pass in an axial direction through the insulation from one group of core plates to the next; in this way it is possible with uninsulated bars and uninsulated holes or channels substantially to prevent current leakage between the bars.

Figure 7:
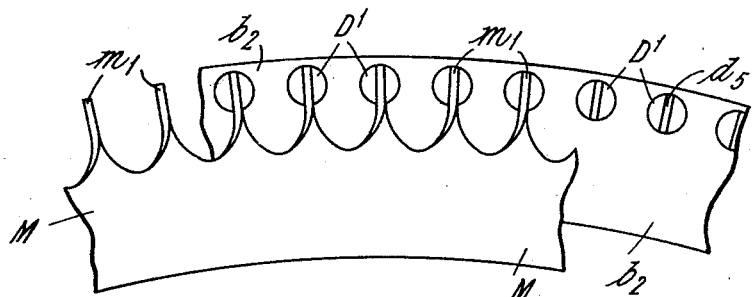
Fig. 7 is a corresponding end elevation viewed from the right hand end of Fig. 6.
Figure 5:
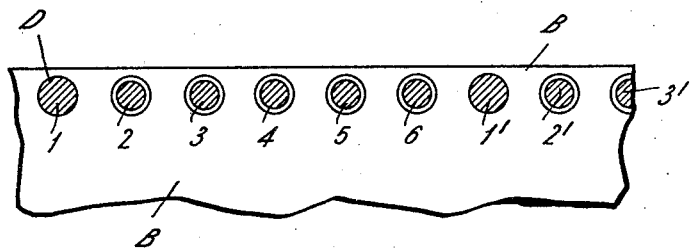
Fig. 5 is a part development in section on a plane at right angles to the rotor bars.

Referring now to Figs. 6 and 7;—the rotor bars $D^1$ are connected at the one end, the left hand end of Fig. 6, by resistance end connections $G^3$ constructed and fitted as described with reference to the end connections G, Figs. 1 to 5. The twisted teeth $g^5$ fit slots $d^4$ in the rotor bars $D^1$. The rotor bars are also connected at this end by inductance end connections $H^3$ having twisted teeth $h^5$ fitting the slots $d^4$ as described in reference to the end connections H of Figs. 1 to 5, the end connections $H^3$ being fitted with rings $J^1$ and $K^1$ of ferruginous material held in position by screws $h^3$ as described.

At the other end, the rotor bars are connected by low resistance end connections M having twisted teeth $m^1$ fitting slots $d^5$ in the rotor bars; any other suitable known forms of end connections may be employed instead of the end connections M.

The constructions shown in Figs. 1 to 5 for the resistance end connections are those preferred, but the said end connections may be made by strip which, instead of being bent into spiral form, as shown in Figs. 1 and 3, may be bent into zigzag form, as shown in Figs. 8 to 11.

Referring first to Figs. 8 and 9;—$D^2$ are the rotor bars and $G^4$ is a metal strip shaped so as to have at suitable intervals lugs $g^6$, which lugs when the strip is bent into zigzag shape as shown are in alignment with the slots $d^6$ cut in the bars $D^2$, the lugs being brazed in the slots and the opposite ends of the circularly disposed zigzag strip being adjacent and being brazed together.

In Figs. 10 and 11, $D^3$ are the rotor bars which are slotted as at $d^7$, the slots being sufficiently long to accommodate two strips $G^5$ and $G^6$ bent into zigzag form and having lugs $g^7$ and $g^8$ which extend into and are brazed in the slots $d^7$.

End connections such as those shown in Figs. 8 and 9 or 10 and 11 may be employed in place of the end connections G of Figs. 1 to 3, or $G^3$ or M of Figs. 6 and 7, the width of the strip and the material of which it is composed being such as to afford suitable resistances.

What we claim as our invention and desire to secure by Letters Patent is:—

1. The improvement in electric motors of the squirrel cage rotor type which consists in providing a number of separate bearing surfaces between the rotor bars and the holes or channels in the core discs in which they are located, the peripheries of the bars between the said bearing surfaces being clear of the walls of the channels, the said bearing surfaces in adjacent bars being located at differing distances axially from the end of the rotor; substantially as described.

2. In a squirrel cage rotor for an electric motor in combination;—a magnetic core; a series of rotor bars for the said core having radial slots in the ends thereof; conductors connecting the ends of the bars consisting of a metallic strip wound on edge so as to form a cylindrical spiral, said spiral being then bent so that its axis forms a circle, the adjacent ends of the strip being connected together and the convolutions of the spiral being secured in position in slots in the ends of the bars; end connections for the bars having comparatively low ohmic resistance and ferruginous material located in contact with the last mentioned end connections and adapted to increase the inductance of the said connections; substantially as described.

3. In a squirrel cage rotor for an electric motor, in combination, a magnetic core, a series of rotor bars for said core, having radial slots in the ends thereof, end connections for the bars consisting of a metallic annular disc having external teeth, the ends of which are twisted through 90° relatively to the plane of the disc and fit in said slots, and two rings of ferruginous material located on opposite sides of the disc part of the end connections and pressed into contact therewith and end-connections having comparatively high ohmic resistance; substantially as described.

4. In a squirrel cage rotor for an electric motor in combination, a magnetic core, a series of rotor bars for said core, having radial slots in the ends thereof, end connections for the bars consisting of a metallic annular disc having external teeth bent at right angles to the disc portion, the bent portions being formed into trough shaped members adapted to be secured to and make contact with the rotor bars, an end ring fixed to the rotor core and adapted to locate the core discs, said disc portion of the end connections being located between the said end ring and the rotor core disc, and end-connections having comparatively high ohmic resistance; substantially as described.

5. In a squirrel cage rotor for an electric motor in combination,—a magnetic core having a series of longitudinal holes therein; rotor bars for the said holes having spaced bearing surfaces between which the cross-sectional dimensions of the bars are reduced so as to be clear of the walls of the holes; end connectors for the said bars having comparatively high ohmic resistance; and end connectors for the bars having comparatively low ohmic resistance; and a body of ferruginous material in contact with the last mentioned end connectors; substantially as described.

6. In a squirrel cage rotor for an electric motor, in combination;—a magnetic core having a series of longitudinal holes therein; rotor bars for the said holes having spaced bearing surfaces between which the cross-sectional dimensions of the bars are reduced so as to clear the walls of the holes, the respective bearing surfaces of the bars in a polar group being staggered; end connectors for the said bars having comparatively high ohmic resistance; and end connectors for the bars having comparatively low ohmic resistance; and a body of ferruginous material in contact with the last mentioned end connectors; substantially as described.

7. In a squirrel cage rotor for an electric motor in combination;—a magnetic core having a series of axial holes or channels formed therein to take the rotor bars; a series of rotor bars for the said channels; bearing surfaces formed at intervals on the said bars adapted to bear against the walls of the said channels, the transverse dimensions of the rotor bars being reduced between the said surfaces so as to be clear of the said walls, and the said bearing surfaces in adjacent bars being located at differing distances from the ends of the rotor core; substantially as described.

8. In a squirrel cage rotor for an electric motor in combination;—a magnetic core having a series of axially disposed holes of circular cross-section formed therein; a series of rotor bars of circular cross-setion having spaced bearing surfaces formed by reducing the diameter of the said bars between the said bearing surfaces, the said bearing surfaces in adjacent bars being located at different distances from the end of the rotor core; substantially as described.

In witness whereof we have set our hands hereto.

ROBERT STAFFORD McLEOD.
GEORGE ERIC MASON.
WILLIAM STANSFIELD.